(12) United States Patent
McCardle et al.

(10) Patent No.: US 8,650,271 B2
(45) Date of Patent: Feb. 11, 2014

(54) CLUSTER MANAGEMENT SYSTEM AND METHOD

(75) Inventors: William Michael McCardle, Spring, TX (US); Ronald Alan Neyland, Spring, TX (US); John Paul Campbell, The Woodlands, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1354 days.

(21) Appl. No.: 12/183,063

(22) Filed: Jul. 31, 2008

(65) Prior Publication Data

US 2008/0288873 A1 Nov. 20, 2008

Related U.S. Application Data

(62) Division of application No. 10/808,645, filed on Mar. 24, 2004, now abandoned.

(51) Int. Cl.
G06F 15/173 (2006.01)
G06F 15/00 (2006.01)
G06T 1/60 (2006.01)

(52) U.S. Cl.
USPC .......... 709/223; 709/213; 709/220; 345/501; 345/530

(58) Field of Classification Search
USPC .......................................... 709/223, 213, 220
See application file for complete search history.

(56) References Cited

U.S. PATENT DOCUMENTS

| | | | | |
|---|---|---|---|---|
| 7,051,215 B2* | 5/2006 | Zimmer et al. | ............... | 713/300 |
| 7,085,961 B2* | 8/2006 | Chang et al. | ..................... | 714/13 |
| 8,218,538 B1* | 7/2012 | Chidambaram et al. | ....... | 370/386 |
| 2002/0099972 A1* | 7/2002 | Walsh et al. | .................... | 714/10 |
| 2003/0204503 A1* | 10/2003 | Hammer et al. | ................... | 707/6 |
| 2003/0204603 A1* | 10/2003 | Buchanan et al. | ............ | 709/228 |
| 2004/0054780 A1* | 3/2004 | Romero | ........................ | 709/226 |
| 2004/0109406 A1* | 6/2004 | Rothman et al. | ............... | 370/216 |
| 2005/0015430 A1* | 1/2005 | Rothman et al. | .............. | 709/201 |
| 2005/0091361 A1* | 4/2005 | Bernstein et al. | ............. | 709/223 |
| 2005/0108375 A1* | 5/2005 | Hallak-Stamler | ............. | 709/223 |
| 2008/0288873 A1* | 11/2008 | McCardle et al. | ............ | 715/735 |

OTHER PUBLICATIONS

ISR/WO, PCT/US2005/009490, HP reference 82220879, Mar. 27, 2007, 9 pps.

* cited by examiner

*Primary Examiner* — Backhean Tiv

(57) ABSTRACT

Compute clustering software embodied in a computer-readable medium and operable to provide a graphical user interface (GUI) is provided, the GUI operable to present a selection area for illustrating a plurality of receptors in a chassis, each receptor configured to couple to a network device, wherein the selection area conveys a physical location of each of the plurality of receptors, receive information from a user to create a defined cluster by pointing and clicking on a portion of the plurality of receptors illustrated in the selection area, present an image selection window with a plurality of software image choices, receive an image selection for each of one or more selected receptors in the defined cluster, and wherein the software is operable to associate each logical address of the defined cluster with a not necessarily same selected one of the plurality of images.

19 Claims, 9 Drawing Sheets

CLUSTER MANAGEMENT SYSTEM AND METHOD

This application is a divisional of, and claims priority from U.S. patent application Ser. No. 10/808,645, filed Mar. 24, 2004, now abandoned which is incorporated by reference in its entirety herein.

TECHNICAL FIELD OF THE INVENTION

The present invention relates generally to the field of network servers and, more particularly to a cluster management system and method.

BACKGROUND OF THE INVENTION

A critical component of both private intranets and the publicly accessible internet is what is commonly referred to as a server. A server is typically a computer, which is capable of receiving requests for information and returning data or performing specialized processing upon the receipt of a network request for such processing. In today's network architectures, smaller users such as individuals or small businesses that require server systems will typically be forced to share part of the processing capability of one of a large scale system. Network devices within the large scale system that are designated to be used by an individual or small business may be clustered to accommodate the needs of larger businesses. A difficulty in providing server technology is associated with the difficulties in configuring and maintaining the clustered network devices. Conventional server systems are typically very complex to administer. Software development efforts have not focused on providing simple user interfaces because the typical personnel that are tasked with maintaining servers are typically very sophisticated network technicians. Large scale server systems that are shared by multiple small users present difficulties in monitoring and metering traffic for individual users.

SUMMARY OF THE INVENTION

In accordance with a particular embodiment of the present invention, a method for compute clustering includes identifying a defined cluster. The cluster may include a plurality of receptors in a chassis, each receptor being configured to couple to chassis to a network device. At least one of the plurality of receptors in the cluster may be unoccupied by a network device. The physical locations associated with each of the plurality of receptors are stored. In accordance with a particular embodiment of the present invention, the stored physical locations include the physical location associated with the at least one receptor in the cluster that is unoccupied by a network device.

In accordance with another embodiment of the present invention, an image designated as a default image for the plurality of receptors in the cluster is received. The default image may be associated with the at least one receptor in the cluster that is unoccupied by a network device. In accordance with a particular embodiment, the image comprises an IP address identifying software that operates to configure the plurality of receptors in the cluster.

In accordance with yet another embodiment of the present invention, the presence of a network device coupled to the at least one receptor in the cluster that was previously unoccupied is detected. In response to detecting the presence, an image is automatically installed on a network device, the image comprising a default image designated for the plurality of receptors in the cluster.

Technical advantages of the present invention include a graphical user interface screen operable to consolidate and manage data communications received from a plurality of network devices to provide a user with an aggregated view of the resources available. Accordingly, clusters of network devices may be monitored and maintained as an entity. Another technical advantage of the present invention includes allowing a user to reserve resources within a system. For example, a receptor may be reserved to a cluster although the receptor is currently unoccupied by a network device. Because the cluster of network devices is managed and configured as an entity, when a network device is coupled to the previously unoccupied receptor, the network device may be automatically configured in the manner desired by the user.

Other technical advantages will be readily apparent to one skilled in the art from the following figures, description, and claims.

BRIEF DESCRIPTION OF THE DRAWINGS

For a more complete understanding of the present invention and its advantages, reference is now made to the following description, taken in conjunction with the accompanying drawings, in which.

DETAILED DESCRIPTION OF THE DRAWINGS

Figure 1:
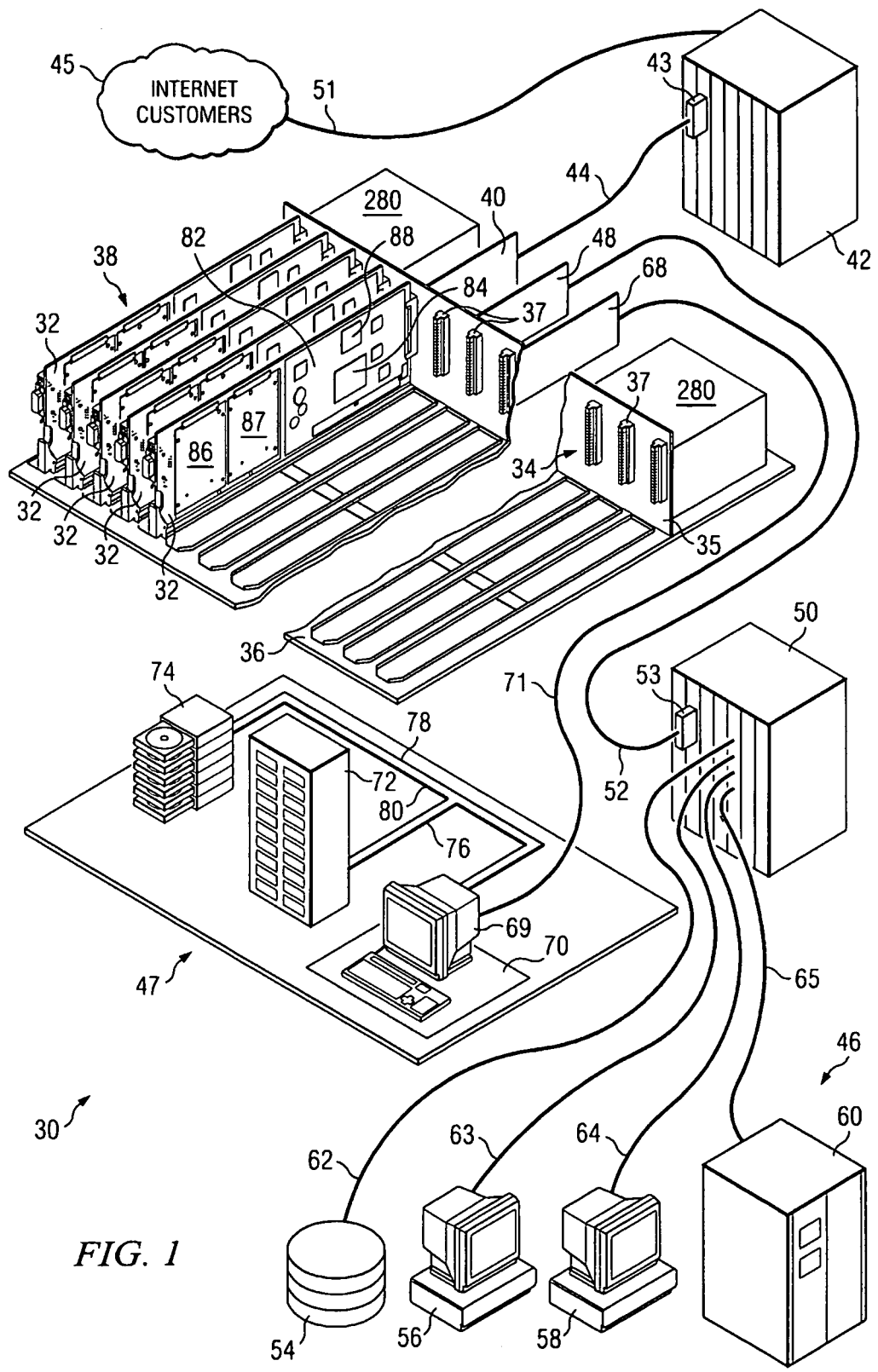
FIG. 1 is a schematic drawing illustrating a plurality of network devices coupled with a public network, a private network, and a management network, in accordance with one embodiment of the present invention.

Referring to FIG. 1, a high density, multiple server network is illustrated and generally designated by the reference number 30. Network 30 includes a plurality of network devices 32 mounted on a base 36 of a server chassis 38 and coupled with a public network 45, a private network 46 and a management network 47. In particular embodiments, network devices 32 may include server processing cards. Each server processing card may be configured to function similarly. Specifically, a server processing card may provide the functionality of a single board computer, which may be employed as a rack mounted server. Networks 45, 46 and 47 may be configured, maintained and operated independently of one another, and cooperate to provide is distributed functionality of network 30.

A network device 32 that includes a server processing card may be a single board computer upon which all of the requisite components and devices are mounted to enable network device 32 to function and operate as a server handling compute tasks. In the illustrated embodiment, each network device 32 within a particular chassis 38 shares a common passive midplane 34 through which all power and connectivity passes. Server chassis 38 is intended for rack mount in server rack 39 (See FIG. 2), and includes passive midplane 34 and all the associated network devices 32. In one embodiment, network device 32 includes a powerful computer that may be connected to the Internet and operable to store data (e.g., audio, video, data graphics and/or text files).

As illustrated, each network device 32 includes a printed circuit board 82, coupled with a central processing unit (CPU) 84, a disk drive 86, and a dynamic memory integrated circuit 88. Central processing unit 84 performs the logic, computational and decision making functions of processing card 32. Many types of central processing units with various specifications may be used within the teachings of the present invention. In the illustrated embodiment, CPU 84 includes a Crusoe 667 MHz CPU, as manufactured by Transmeta. In fact, many central processing units with comparable processing power to a 500 MHz, Pentium III, as manufactured by Intel, may be used within the teachings of the present invention. For example, the Crusoe TM 3200 with speeds in the range of 300-400 MHz, or TM 5400 with speeds in the range of 500-700 MHz, may also be used. Disk drive 86 includes electronics, motors, and other devices operable to store (write) and retrieve (read) data on a disk. In the illustrated embodiment, disk drive 86 includes a two and one-half inch IBM 9.5 mm notebook hard drive. A second two and one-half inch disk drive 87 may be installed upon a given network device 32. The use of disk drive 87 is optional, and increases the capacity and functionality of network device 32.

In accordance with a particular embodiment of the present invention, each network device 32 is coupled with a passive midplane 34. On its front face 35, passive midplane 34 includes a plurality of receptors 37 that facilitate the installation of network devices 32. In particular embodiments, passive midplane 34 includes twenty-four receptors 37 to couple to up to twenty-four network devices 32. The rear face of passive midplane 34 also includes a plurality of network interface card connectors. Passive midplane 34 is considered "passive" because it may be provided with no active components that can fail. Instead, passive midplane 34 includes the necessary wiring to connect each respective network device 32 with an appropriate network interface card 40, 48, and 67. Passive midplane 34 includes a printed circuit board with the appropriate printed circuitry to distribute data and power necessary for the operation of network 30. For example, passive midplane 34 distributes power to components of network devices 32 and network interface cards 40, 48, and 67. Additionally, passive midplane 34 distributes data and/or communication signals between network devices 32 and network interface cards 40, 48, and 67. As will be described in further detail with regard to FIGS. 4-8, passive midplane 34 "autosenses" network devices 32 and available receptors 37, to allow automatic configuration of networks via remote management system 70.

The rear face (not shown) of passive midplane 34 includes a pair of power supply mounting mechanisms which accommodate power supplies 280. Each power supply 280 includes enough power to operate a fully populated passive midplane 34, in the event that one of the two power supplies 280 fails. Accordingly, server chassis 38 may be offered and operated using a single power supply 280, with an optional upgrade to a second power supply 280. Since each power supply 280 is sized appropriately to operate an entire chassis 38, a single power supply 280 may be removed from chassis 38, without powering OFF server chassis 38, or affecting the operation of network 30.

In particular embodiments, power supplies 280 may be load balanced if power supplies 280 include "auto sensing" capabilities. Auto-sensing capabilities enable each power supply 280 to sense the load required of it. The printed circuitry associated with midplane 34 evenly distributes the necessary power consumption load between power supplies 280. Therefore, power supplies 280 will automatically supply one half of the necessary power (voltage) to midplane 34 when each power supply 280 is properly connected and fully operational. If service from one power supply 280 is diminished, or becomes unavailable, the other power supply 280 may sense this and supply the power necessary for passive midplane 34 to operate at fully capacity. In another embodiment, power supplies 280 and midplane 34 may be provided with the printed circuitry necessary to allow power supplies 280 to communicate with one another regarding their load sharing responsibilities, and report trouble and/or diminished capacity to one another. Power supplies 280 also include interfaces that allow management network interface card 68 and remote management system 70 to monitor voltage and temperature of each power supply 280.

A network interface card 40 couples passive midplane 34, and therefore network devices 32 with a public network switch 42, via communication link 44. In particular embodiments, network interface card 40 may support up to twenty-four independent server processing cards. Thus, communication link 44 may include twenty-four groups of two twisted pair category 5 cable, for a total of forty-eight different Ethernet connections, or ninety-six wires total. Public network switch 42 distributes data between network devices 32 and public network 45. The connection between public network switch 42 and network interface card 40 may be accomplished with high density Ethernet connectors. In particular embodiments, public network switch 42 may include a Cisco Catalyst 5500, an industry standard Ethernet switch, or a Black Diamond public switch, as manufactured by Extreme Networks. Throughout this specification, however, the term "switch" may be used to indicate any switch, router, bridge, hub, or other data/communication transfer point.

A high density connector 43 may be coupled with public switch 42 to facilitate communication between public switch 42 and communications link 44. In one embodiment, high density connector 43 may include an RJ-21 high density telco (telephone company) type connector for consolidating at least twelve 10/100/1000 megabits per second Ethernet connections through a single cable. The use of high density telco style connectors, like high density connector 43 allows the consolidation of twelve, twenty-four or forty-eight Ethernet connections, at a twelve to one ratio, through a single cable.

Communication link 44 is operable to provide gigabit Ethernet over fiber. In another embodiment, communication link 44 may include gigabit Ethernet over copper. The coupling between public switch 42 and network interface card 40 may be accomplished using a single communication link 44. However, in another embodiment a second communication link 44 may be provided to accomplish a redundant configuration. This allows a back-up communication link between public switch 42 and network interface card 40, in case of failure of the primary communication link. Accordingly, redundant fiber connections to public switch 42 or other high density data center switches capable of aggregating hundreds of gigabit connections in a single switch 42, are provided.

Public switch 42 is coupled with public network 45 over communications link 51. Public network 45 may include a variety of networks including, without limitation, local area networks (LANs), wide area networks (WANs), and/or Metropolitan Area Networks (MANs). In the illustrated embodiment, public network 45 may include the Internet. Communication link 51 may include a high bandwidth transport in order to serve a plurality of servers on an internet service provider (ISP) or application service provider (ASP). For example, and without limitation, communication link 51 may include a T3 or OC48 in a particular embodiment.

A second network interface card 48 is coupled with passive midplane 34 and distributes data to a private network switch 50 via communication link 52. Similar to public network switch 42, private network switch 50 may also include either a Catalyst 5500, as manufactured by Cisco, or a Black Diamond, as manufactured by Extreme Networks. A high density connector 53 may be provided to facilitate communication between private network switch 50 and communications link 52, and ultimately, network interface card 48. In a particular embodiment, high density connector 53 may include an RJ-21 high density telco type connector for consolidating at least twelve 10/100/1000 megabits per second Ethernet connections through a single cable. As previously described, the use of high density telco style connectors, like high density connector 53 allows the consolidation of twelve, twenty-four or forty-eight Ethernet connections at a twelve to one ratio, through a single cable.

Private network switch 50 is coupled with a plurality of "back office" network applications including storage server 54, applications server 56, database server 58 and legacy systems 60 through communication links 62, 63, 64 and 65, respectively. Throughout this specification, "back office" will be used to indicate operations, management and support tasks used to support the operation of network devices 32, which are accomplished at remote locations from server chassis 38. Communication links 62-65 provide private 10/100/1000 megabits per second Ethernet supporting various high volume business transaction processing systems (HVBTPS). Storage server 54 provides mass storage to support server processing cards of various users. This is a private connection because server 54 is not linked directly to public network 45. Storage server 54 provides network attached storage (NAS). Application server 56 may be rented, or provided by an application service provider (ASP). Database server 58 provides transaction processing, and legacy systems 60 may include various database servers.

Private network 46 may be configured to provide a plurality of "back-end" network applications. For example, private network 46 may provide end users with secure internet voicemail, internet fax, a "personal" server, electronic mail accounts, MP-3 servers and/or digital photo collection servers. In another embodiment, private network 46 may be configured to provide groupware and other associated applications. For example, private network 46 may include the necessary hardware and software to provide users of network 30 with "chat rooms" and other on-line meeting applications. Wireless Application Protocols (WAPs) applications may also be provided. In fact, the WAP applications may be synchronized to groupware associated with the network devices. Regardless, private network 46 is considered "private," because there is no physical connection between private network 46 and public network 45. Accordingly, security is provided to data and communications of private network 46 because private network 46 is protected from a security breach initiated from public network 45.

Passive midplane 34 is also coupled to remote management system 70 of management network 47 through a third network interface card 68. Network interface card 68 is coupled to management network 47 by communication link 71, which distributes data between passive midplane 34 and remote management system 70. One or more online/nearline memory storage devices, including non-volatile storage device 72 and secondary non-volatile storage device 74 communicate with management console 70 using communication links 76 and 78, respectively. Memory storage devices 72 and 74 communicate with one another through communication link 80. Remote management system 70, non-volatile storage device 72, and secondary non-volatile storage device 74 also provide in-line/near-line storage support for network devices 32. Storage devices 72 and 74 may include high capacity redundant array of inexpensive disks (RAID)/optical/tape subsystem controlled by hierarchical storage management software that enables automatic back-up and restoration of user data from all servers via remote management system 70.

As will be described in more detail with regard to FIGS. 4-8, remote management system 70 includes the ability to monitor, manage, back-up, restore, activate, and operate many of the components of high density server network 30. For example, an operator of a remote management system 70 can control all of the functions and operations of network devices 32. In particular embodiments, remote management system 70 includes control software and other applications that accomplish these functions and operations automatically, without operator intervention. For example, remote management system 70 may perform metering, including without limitation packet level metering, and bandwidth monitoring of network devices 32. Other characteristics and measurements which remote management system 70 collects, evaluates, and stores include operating data and other information regarding network devices 32.

Remote management system 70 identifies each network device 32 according to at least two identifiers. For example, during start-up of each network device 32, remote management system 70 is informed of a hardware address associated with each network device 32. The hardware address is analogous to the IP address assigned by the server to each client, in a client/server network system. The hardware address of each network device 32 may be referred to as the "logical" address of a particular network device 32.

Also during the startup of network devices 32, remote management system 70 is informed of a three digit rack/chassis/slot address identifier unique to each network device 32. The rack/chassis/slot address may also be referred to as the physical identifier, or physical address of a particular network device 32. The physical address allows remote management system 70 to identify a particular network device 32 in a manner which is more readily identifiable to an operator of remote management system 70 or other user of server network 30.

Remote management system 70 has the ability to provide a single point of management for thousands of servers. The servers under the control of remote management system 70 may include thousands of network devices 32. Thus, remote management system 70 includes various software, applications, and functionality that simplify and improve the operation of associated servers, including without limitation network devices 32. Management software, applications, and functionality associated with remote management system 70 typically reside on a server.

A web browser based, graphical user interface 69 associated with remote management system 70 provides the operator of management network 47 with a user-friendly, easy to read overview of operational functions in graphical formats, suitable for "at a glance" monitoring and diagnosis. This includes an intuitive user interface for controlling basic functionality of servers on a single server level. Accordingly, a network operator or administrator may add, delete, configure, or modify virtual servers and/or network devices 32. Similarly, remote management system 70 may be used to add, delete, configure, and modify users who are granted access to network devices 32 of public network 45. Example graphical formats will be described in more detail with regard to FIGS. 4-8. Remote management system 70 also provides operations, administration, management, and provisioning (OAM&P) functionality to the network administrator. Traffic metering and measurement (TM&M) and performance measurements are also collected, stored, analyzed and maintained by remote management system 70.

Similar to private network 46, management network 47 is considered a "private" network. Since there is no physical connection between management network 47 and public network 45, management network 47 is protected from a security breach initiated from public network 45.

Figure 2:
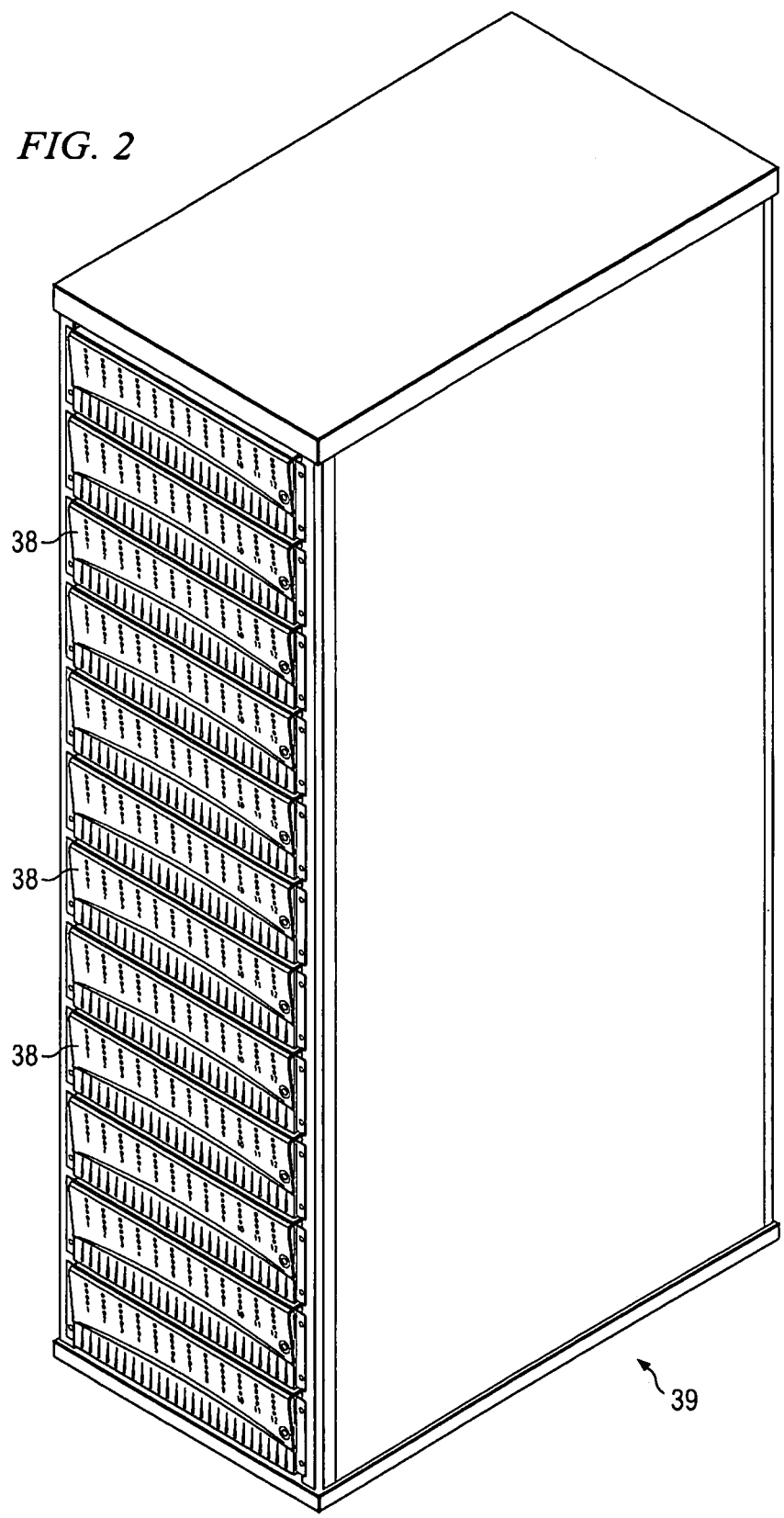
FIG. 2 is an isometric view, illustrating a server rack, in accordance with one embodiment of the present invention.

FIG. 2 illustrates a server rack 39 including a plurality of server chassis 38. For purposes of this specification, a standard industry rack has the approximate dimensions nineteen inches wide by six feet high by thirty to thirty-four inches deep. In a particular embodiment, each server chassis 38 consumes a total of 3 U (1 U=1.75 inches) of space. Accordingly, as many as fourteen server chassis 38 may be installed in an industry standard 42 U rack. The user of server processing card 32 having two, two and one-half inch disk drives allows for the installation of three hundred and thirty-six servers within an industry standard rack having 42 U of usable interior space (standard industry rack). In alternative embodiments, chassis may be provided that are 7 U or greater, and as small as 1 U.

Server rack 39 is configured to provide a user friendly operating environment. For example, server rack 39 may be co-located at the physical location of an internet service provider (ISP) or an applications service provider (ASP). Moreover, due to the ease of use and operation, unsophisticated employees of the ISP/ASP can easily operate and maintain all of the components associated with server rack 39. The design and configuration of server processing cards 32 accommodate an extremely low total cost of ownership (TCO).

Figure 3:
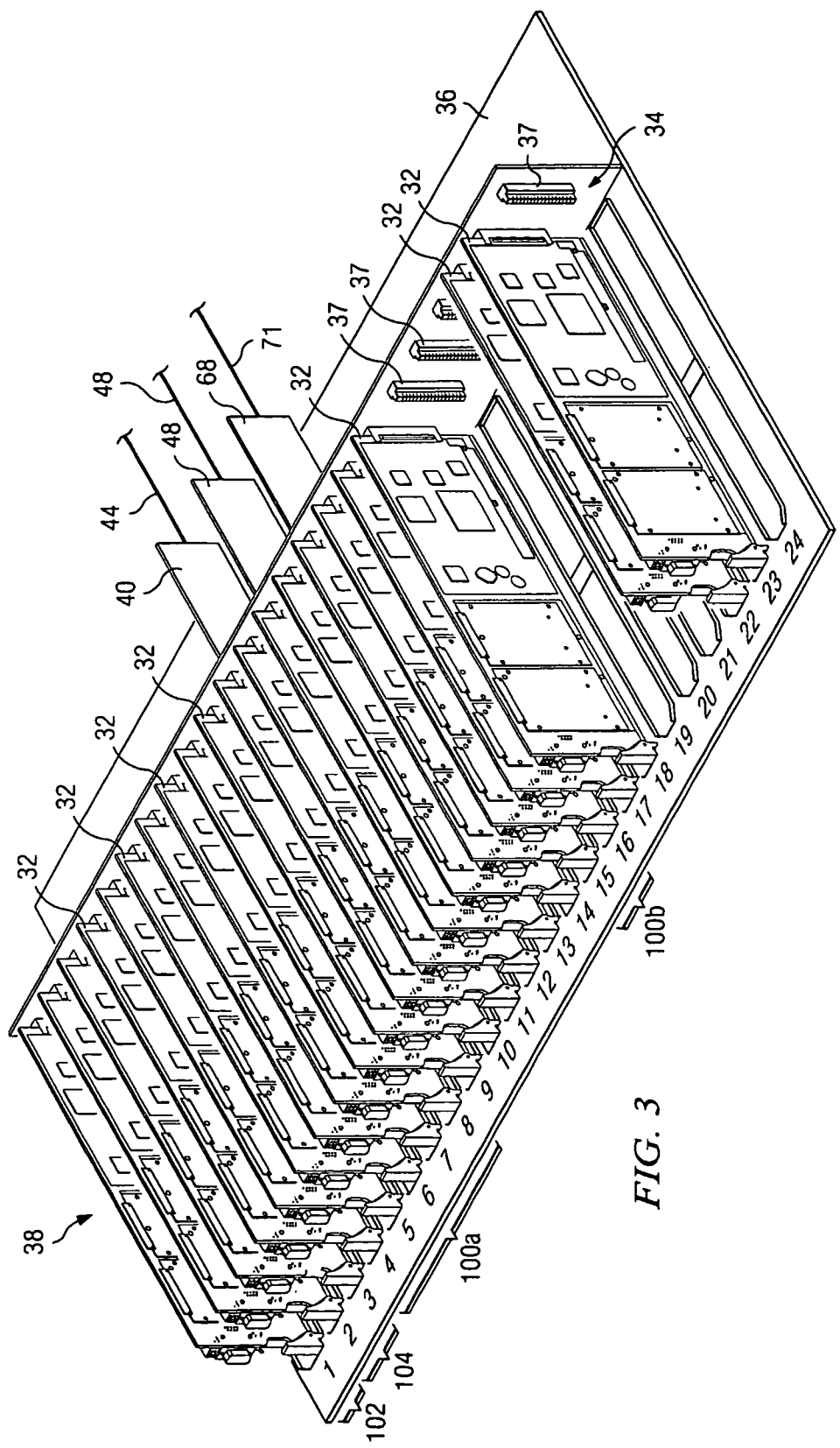
FIG. 3 is a schematic drawing illustrating an example server chassis that includes clustered network devices.

To ease the management and maintenance of the many network devices 32 in a rack 39, multiple network devices 32 within a rack 39 or chassis 38 may be clustered. For example, a "cluster" of server processing cards includes those server processing cards that are joined logically and/or physically in order to provide a sealed level of service to a user. FIG. 3 illustrates an example server chassis 38 that includes clusters 100 of network devices 32. During operation, cluster 100 may also be managed as an entity. Cluster 100 may be expanded and reconfigured to meet changing requirements of the system. Network devices 32 may be removed or added from cluster 100. Because cluster 100 operates as an entity, the attributes associated with a cluster 100 may be automatically applied to network devices 32 added to a cluster 100. Where desirable, the imaging and syncing of new network devices 32 may be automated.

A cluster 100 functions as a single system for performing compute tasks. Accordingly, each cluster 100 may be used as a productive tool to reduce the costs associated with the creation, maintenance, and management of network devices 32. Specifically, network devices 32 in a particular cluster 100 may have one or more attributes associated with the cluster 100. The attributes may be common to each network device 32 in the particular cluster 100. Additionally, the attributes may be unique to the cluster 100 as a whole. During creation of each cluster 100, the attributes associated with a cluster 100 may include configuration actions that are automatically applied to every network device 32 in the cluster 100. Such attributes may include a name identifying the cluster 100, the designation of a cluster manager, the type of interconnect used for the cluster 100, an image identifying software to be associated with the cluster 100, and any other attribute unique to the cluster 100. The attributes that may be associated with a cluster 100 will be discussed in more detail with regard to FIGS. 4-9.

As illustrated, server chassis 38 includes two defined clusters 100a and 100b. Cluster 100a includes five active network devices 32, such as server processing cards, in positions four through eight of server chassis 38. Cluster 100b includes two network devices 32 in positions fifteen and sixteen of server chassis 38. Although clusters 100a and 100b are illustrated as including five and two network devices 32, respectively, a cluster 100, may include any appropriate number of network devices 32. For example, a single cluster 100 may be comprised of tens of server processing cards or as many as hundreds or thousands of server processing cards. Thus, a cluster 100 may include server processing cards from a single chassis 38 or multiple chassis 38 within rack 39. Additionally, cluster 100 may include server processing cards from multiple racks 39.

As illustrated, chassis 38 includes additional network devices 32 that are not "clustered." For example, the network device 32 in position one of chassis 38 is designated a control tower 102. Control tower 102 operates to manage network devices 32 and clusters 100. In particular embodiments, each chassis 38 within server rack 39 may include a control tower 102 that operates to manage the network devices 32 and any clusters 100 in the particular chassis 38. In other embodiments, a single server rack 39 may include only one control tower 102. Thus, the management operations performed by control tower 102 need not be limited to the particular server chassis 38 in which control tower 102 is located. Further, a control tower 102 located in server rack 39 may also operate to perform management operations on network devices 32 and clusters 100 in other server racks 39. Although control tower 102 is typically independent of any defined clusters 100, control tower 102 may include a network device 32 that is grouped in a cluster 100.

Chassis 38 may also include network devices 32 that run independently of clusters 100. For example, chassis 38 includes network devices 32 in positions nine through fourteen, seventeen through eighteen, and twenty-two through twenty-three, which are not defined to clusters 100a and 100b. Such network devices 32, though not designated to a cluster 100, may be available for designation to an existing cluster 100a or 100b or to a new cluster as the needs of system 30 are expanded. Alternatively, one or more network devices 32 in chassis 38 may be designated as protected. A protected position is one that cannot be designated to a cluster. Accordingly, network devices 32 that are coupled to protected receptors 37 are not available for designation to clusters 100a or 100b or to a new cluster. In the illustrated chassis 38, positions 2 and 3 are protected positions. Protected nodes 104 may be reserved for administrative functions.

As illustrated, chassis 38 also includes one or more unoccupied receptors 37. An unoccupied receptor 37 is a receptor 37 that is not coupled to a network device 32 but may be available to be coupled to a network devices 32. As illustrated, positions nineteen, twenty, twenty-one, and twenty-four of chassis 38 include unoccupied receptors 37. As will be described in more detail, with regard to FIG. 5, one or more of these available positions may be pre-registered for a cluster 100. Accordingly, an unoccupied receptor 37 may be designated as a receptor 37 belonging to a defined cluster 100a or 100b even though the receptor 37 is currently vacant. Because each cluster is managed and configured as an entity, the attributes associated with cluster 100 may also be attributed to the pre-registered receptor 37. In this manner, resources in chassis 38 may be reserved and automatically configured upon future expansion of defined clusters 100a or 100b.

As previously described, management network interface card 68 and remote management system 70 include the ability to monitor and manage components of network 30. Accordingly, various measurements and characteristics regarding the functionality and operation of clusters 100 may be collected, stored, analyzed, and maintained using network management card 68 and remote management system 70. Remote management system 70 includes a graphical interface 69 which displays collected and stored information regarding the operation of clusters 100. FIGS. 4-9 illustrate example graphical interface screens that may be displayed to a user to assist the user in the management, monitoring, and creation of clusters 100. The format of the information displayed in the graphical interface screens is merely exemplary. It is understood that the information displayed on the graphical interface screens may be in any format appropriate for conveying information about the functionality and operation of clusters 100 to the user.

The embedded circuitry of network devices 32 transfers the information, at predetermined intervals, through passive midplane 34 to management network interface card 68. This information is captured and stored within remote management system 70 for further processing. Remote management system 70 includes the hardware and software components required to collect, store, and analyze this information. Remote management system 70 then operates to aggregate the information for each cluster 100 and displays the cluster information to the user for maintenance and management. Remote management system 70 may also include the ability to react to the cluster information collected.

Resource Aggregation

Figure 4A:
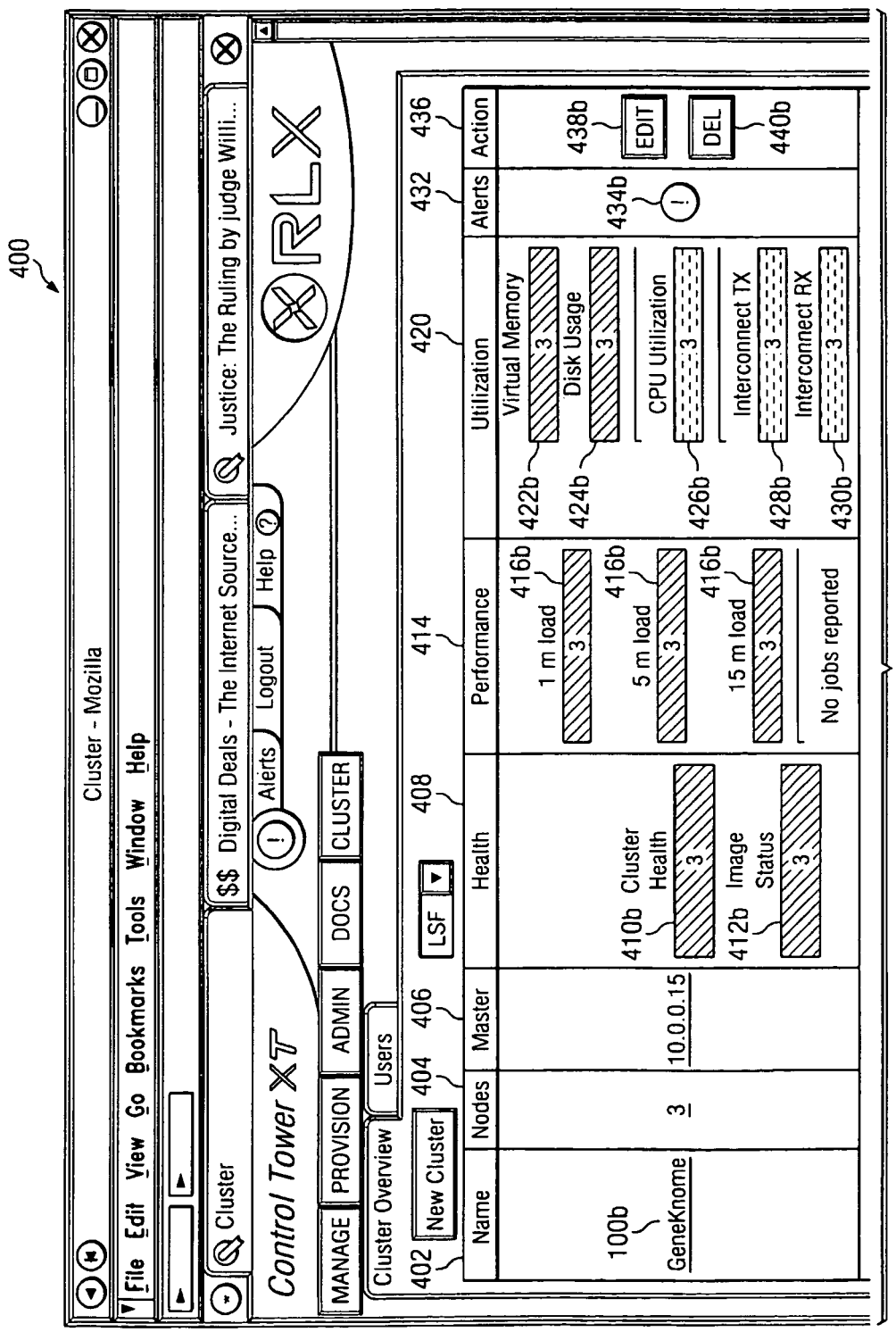
FIGS. 4-8 are schematic drawings illustrating example graphical user interface screens for monitoring and managing a cluster of network devices.
Figure 4B:
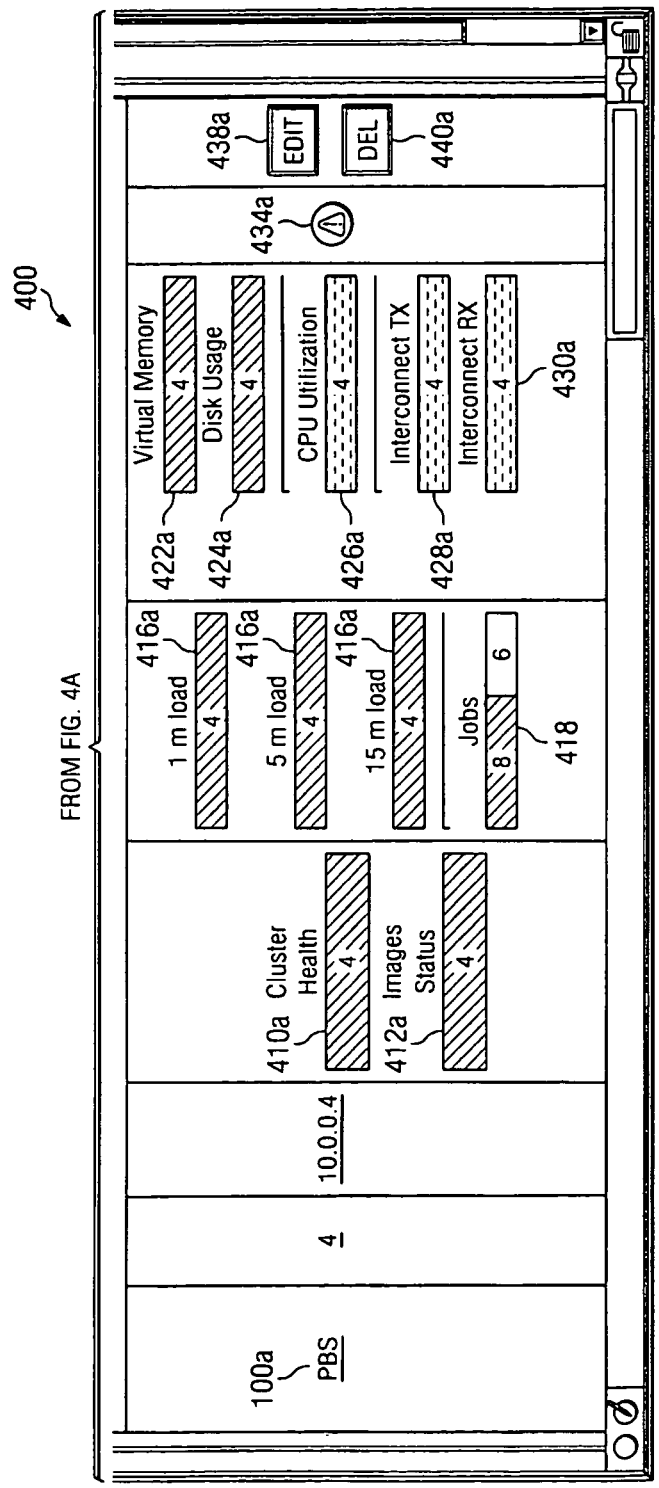

An aggregated overview of the cluster information may be displayed to the user to enable the user to manage a defined cluster 100 as an entity. FIG. 4 illustrates a graphical interface screen 400 that displays an aggregated overview of clusters 100 within chassis 38 or server rack 39. The aggregated overview may include information in the form of "snapshot" and historical measurements associated with clusters 100. Snapshot measurements include those measurements that represent the value at a given point in time. Historical information includes measurements that have been collected over time.

Graphical interface screen 400 includes columns associated with various attributes and characteristics related to each cluster 100. Name 402 identifies the name of each cluster 100 listed on graphical interface screen 400. For the illustrated example, graphical interface screen 400 includes information relating to two clusters, PBS and GeneKnome. For discussion purposes, PBS and GeneKnome correspond with clusters 100a and 100b of FIG. 3, respectively. Node 404 identifies the number of network devices 32 that are designated to a cluster 100. For example, graphical interface screen 400 indicates that cluster 100a has four network devices 32 coupled to receptors 37 that are designated to cluster 100a. Cluster 100b has three network devices 32 coupled to receptors 37 that are designated to cluster 100b. Master 406 identifies the physical address for the network device 32 that operates as the cluster manager for each cluster 100. As discussed above with regard to FIG. 1, the physical address may include a three digit identifier that identifies the rack, chassis, and receptor of the network device 32 operating as the cluster manager. As indicated by master 406, the particular network devices 32 operating as the cluster managers for clusters 100a and 100b have physical addresses of 10.0.0.4 and 10.0.0.15, respectively.

Graphical interface screen 400 also includes a column that summarizes the health 408 of each listed cluster 100. As illustrated, health 408 includes two indicators for each cluster 100a and 100b. The indicators are illustrated as including shaded bars that may proportionately reflect the health of clusters 100. Accordingly, a first shade may be used to indicate healthy nodes within cluster 100, and a second shade may be used to indicate unhealthy nodes in cluster 100. As illustrated, each shaded portion of the indicator also includes a number to display numerically the relative number of healthy and unhealthy nodes. Accordingly, graphical user interface screen 400 uses both a graphical and numerical format for displaying information to the user. However, graphical user interface screen 400 may use any appropriate format to convey information about the clusters 100 to the user. In particular embodiments, where graphical interface 69 is able to display graphical user interface screen 400 in color, the indicators may include variable colored bars. Thus, a first color may be used to indicate healthy nodes and a second color may be used to indicate unhealthy nodes.

First indicator summarizes the cluster health 410 for the particular cluster 100. Cluster health 410 may take into account whether the voltages on network devices 32 within the particular cluster 100 are correct, whether the fans for the particular cluster 100 are operating, and any other information specific to the operation of hardware supporting the cluster 100 on the server chassis 38. As described above, proportionately shaded or colored sections of cluster health 410 display the relative health of the nodes in the particular cluster. Because cluster health 410a and cluster health 410b each include only one shade, the user may easily determine that all network devices 32 in each cluster 100 are healthy. Additionally, cluster health 410a includes the numeral "4" to indicate that all four nodes, or network devices 32, in cluster 100a are healthy. Similarly, cluster health 410b includes the numeral "3" to indicate that all three nodes of cluster 100b are healthy.

Health 408 of graphical interface screen 400 also includes a second indicator reflecting image status 412 for each cluster 100. As will be described in greater detail below, an image may be associated or designated by the user for each network device 32 in chassis 38 and rack 39. Further, each network device 32 in a cluster 100 may be associated with the same image. The image may include an IP address and/or a physical location that identifies software that operates to configure the network devices 32 in the particular cluster 100. Accordingly, image status 412 may take into account whether the network devices 32 in a cluster 100 are associated with an operational image and/or any other information specific to the images designated for network devices 32 in cluster 100. As illustrated, image status 412 also includes a proportionately shaded or colored bar that includes a number within each proportionately shaded or colored section to indicate how many nodes, or network devices 32, are associated with an operational image and how many nodes are not associated with an operational image. For example, image status 412a indicates that all four nodes of cluster 100a are associated with an operational image. Similarly, image status 412b indicates that all three nodes of cluster 100b are associated with an operational image.

Graphical interface screen 400 also includes a column indicating the overall performance 414 of each cluster 100. Performance 414 provides snapshot information of the loads on the network devices 32 in a particular cluster 100. Multiple load indicators 416 may be used to summarize the ability of each cluster 100 to handle a given load. For example, the indicators 416a associated with cluster 100a indicate that all four network devices 32 designated to cluster 100a are able to handle a 1 m load, a 5 m load, and a 15 m load. Similarly, the indicators 416b associated with cluster 100b indicate that all three network devices 32 designated to cluster 100b are able to handle a 1 m load, a 5 m load, and a 15 m load. For each cluster 100, performance 414 may also include an indicator 418 summarizing the jobs running on cluster. Jobs reported include the resources the job is using and attributes of the job (e.g., execution host, submissions host, directories used, etc.). For example, indicator 418a indicates that there are currently 14 jobs in the queue for cluster 100a. The differently shaded or colored portions of indicator 418a indicates to the user, however, that only eight of the jobs are currently running. The remaining six jobs may be suspended or pending (e.g., green running, blue=pending, yellow=suspended). Because no jobs are reported for cluster 100b, however, graphical user interface screen 400 does not include an indicator 418 for cluster 100b.

Graphical interface screen 400 also includes a column indicating the overall utilization 420 of the hardware associated with each cluster 100. Specifically, indicators are used to indicate the utilization of specific pieces of information that are reported for the hardware of each cluster 100. Virtual memory indicators 422a and 422b summarize network devices 32 designated to each cluster 100a and 100b, respectively, that have available memory. Disk usage indicators 424a and 424b summarize the network devices 32 designated to each cluster 100a and 100b, respectively, that have disk memory availability. CPU utilization indicators 426a and 426b summarize the utilization of the CPUs associated with each network device 32 in clusters 100a and 100b, respectively. Interconnect TX indicators 428a and 428b summarize transmitted bits (Mb/s) for each cluster 100a and 100b, respectively. Interconnect RX indicators 430a and 430b summarize received bits (Mb/s) for each cluster 100a and 100b, respectively.

Graphical interface screen 400 also includes a column indicating alerts 432 for each cluster 100a and 100b. A symbol 434 or other indicator may be used in alert 432 to identify to the user whether any component of a cluster 100a or 100b has failed. Examples of a failure in a particular cluster 100 may include the overheating of a network device 32 in the particular cluster 100, a voltage irregularity within the cluster 100, or any other occurrence which may render a component of the cluster 100 to become partly or wholly inoperational. Different symbols 434 may be used to indicate the severity of the failure. For example, symbol 434a is an exclamation point enclosed in a triangle, which is a universally recognized symbol for a hazard. Thus, symbol 434a may predict a prospective failure within cluster 100a. In contrast, symbol 434b is an exclamation point surrounded by a circle which is a universally recognized symbol for a warning. Thus, symbol 434b may demonstrate to a user that a component of cluster 100b has already failed.

Graphical interface screen 400 also includes a column labeled action 436. Action 436 provides the user with two operators that may be selected. An edit operator 438 enables the user to edit cluster configuration. A delete operator 440 enables the user to delete/shut down cluster and remove managed configuration information.

Cluster Creation and Resource Reservation

Figure 5:
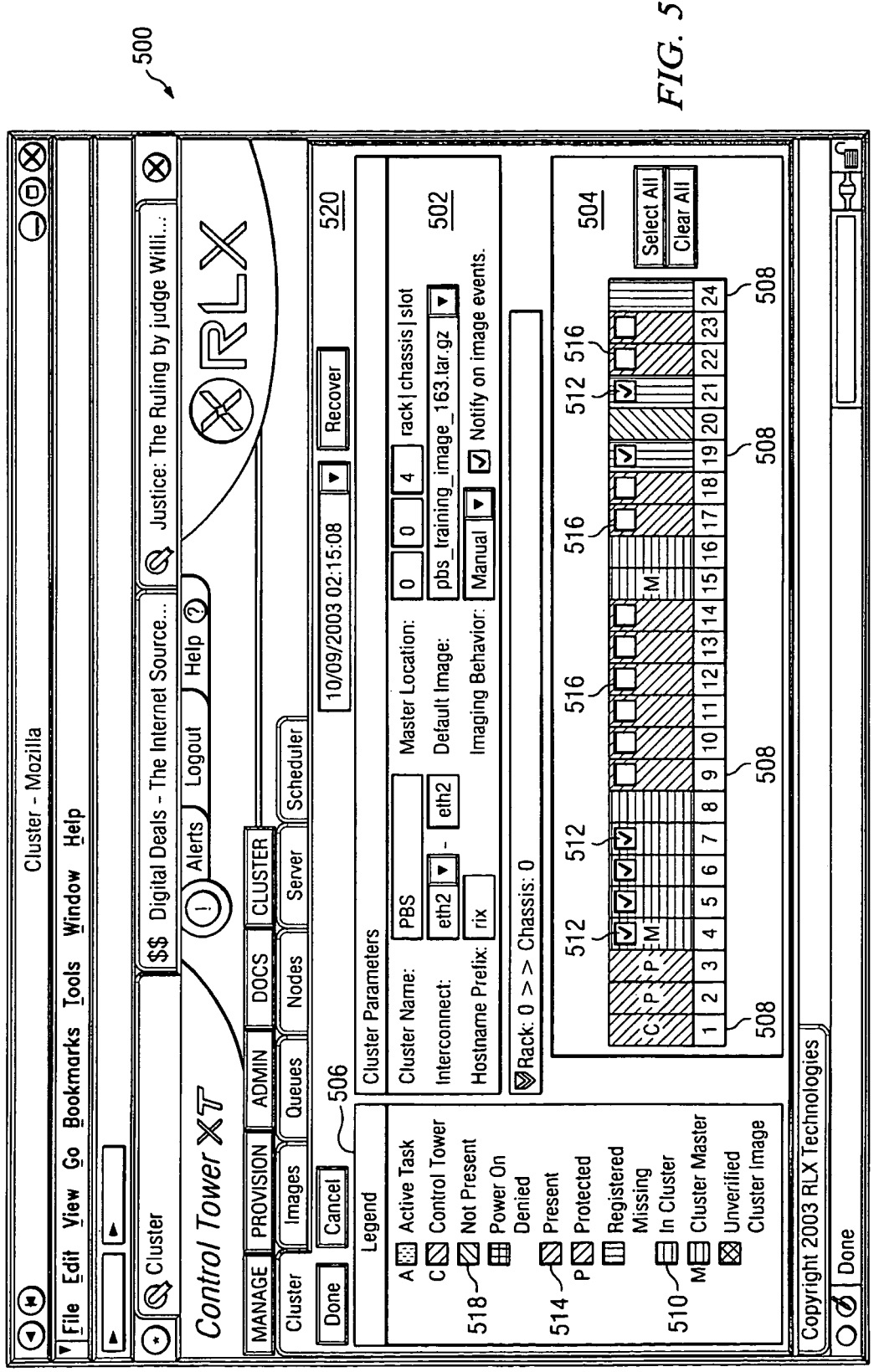

In particular embodiments, graphical user interface screen 400 may be linked to other graphical user interface screens providing different or more detailed information about clusters 100. Thus, the name of a cluster or the IP address of the cluster manager may operate as a link to another graphical user interface screen providing more detailed information about the particular cluster 100. For example, if a user selects the name "PBS" from name 402 for cluster 100a, the user may be directed to a graphical user interface screen that allows the user to define cluster 100a or select attributes for cluster 100a. FIG. 5 illustrates an example graphical user interface screen 500 that allows for the creation and management of defined cluster 100a. Graphical user interface screen 500 includes a parameter area 502 for defining cluster parameters, a selection area 504 for selecting positions or receptors 37 within chassis 38 to belong to cluster 100a, and a legend area 506 providing a key to the information provided in selection area 504.

Parameter area 502 provides basic information about cluster 100a. Thus, parameter area 502 includes windows displaying to the user the cluster name, the type of interconnect, a host name prefix, and the master location of the network device 32 that operates as the cluster manager for cluster 100a. Before creation of cluster 100a, the windows may be blank, and the user may use graphical interface screen 500 to define the parameters for cluster 100a by entering information into the windows. As illustrated, the user may type in a cluster name and choose an interconnect type from a drop down list. Additionally, a user may enter a hostname prefix and define the master location of the cluster master. The master location may include the physical address of the network device 32 operating as the cluster master.

Cluster parameters 502 also includes multiple windows for defining a default image to be associated with network devices 32 in cluster 100a and for designating imaging behavior. The default image and imaging behavior windows allow the user to select choices from a pull down menu. The pull down menu for the default image window may include multiple IP addresses identifying different software that may be chosen to configure network devices 32 in cluster 100a. The pull down menu for the imaging behavior window may allow the user to select from manual or automatic imaging. As will be described in more detail below, whether automatic or manual imaging behavior is selected determines how images will be applied as additional network devices 32 are added to cluster 100a.

Figure 6:
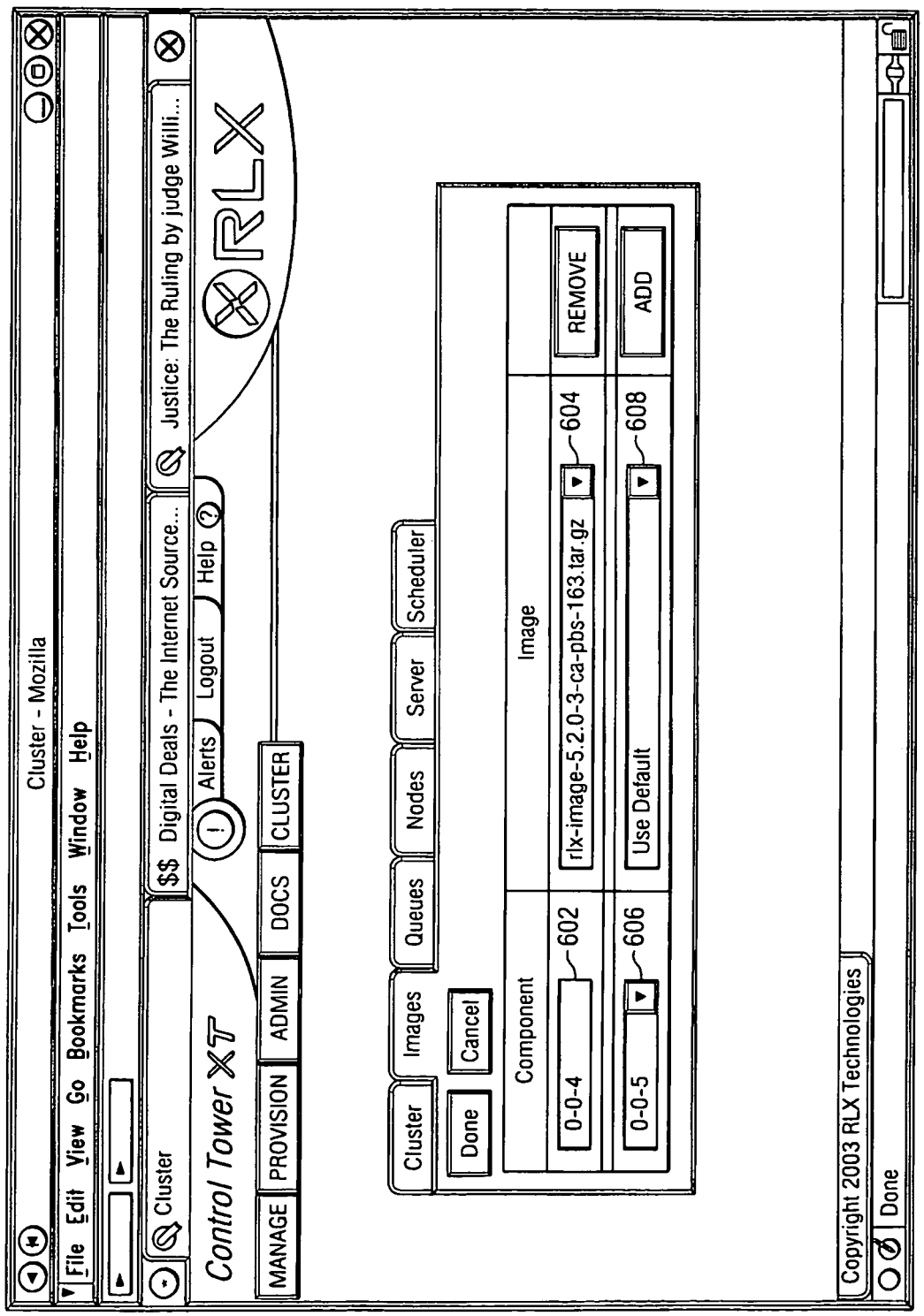

Although a default image may be selected for each network device 32 in the cluster 100a using graphical user interface screen 500, it may be desirable to define different images for specific network devices 32 in cluster 100a. FIG. 6 illustrates an example graphical user interface screen 600 that further allows a user to define images for cluster 100a. In particular embodiments, a user may desire to designate an image other than the default image for the network device 32 that operates as the cluster manager. Graphical user interface screen 600 includes a master location window 602 that specifies the master location of the network device 32 operating as the cluster master. The master location of the cluster master is the same as that specified on graphical user interface screen 500 and includes the physical address of the cluster manager. Graphical user interface screen 600 also includes an image window 604 associated with the cluster master. As illustrated, image window 604 is a pull down window that allows the user to select an image from a list of choices. For the illustrated example, the image selected for the cluster manager of cluster 100a is rlx-image-5.2.0.3-ca-pbs-163.tar.gz. The IP address provided, however, is merely exemplary. Image window 604 may include any appropriate IP address for identifying configuration software for the cluster manager. Additionally, image window 604 is illustrated as including a pull down window, image window 604 may alternatively include a window that allows a user to type in an IP address for a desired image.

Graphical user interface screen 600 also includes component location window 606. As illustrated, component location window 606 allows the user of graphical user interface screen 600 to select any network device 32 defined to the cluster 100 from a drop down window. Similar to master location window 602, component location window 606 includes a three digit physical address for each network device 32. Also similar to master location window 602, the three digits of the physical address corresponds with the rack, chassis, and receptor of the particular network device 32. For the particular example cluster 100a, the drop down window would allow a user to select 0-0-5, 0-0-6, or 0-0-7.

Although the default image specified in graphical user interface screen 500 is typically applied to each network device 32 in cluster 100 (other than the cluster master), graphical user interface screen 600 for the cluster 100, allows a user to select custom images for each network device 32 in cluster 100 if desired. Accordingly, graphical user interface screen 600 includes a image selection window 608 that allows the user to define an image for a particular network device 32 in cluster 100. As illustrated, image selection window 608 is a drop down window that allows a user to select the location reservation (rack/chassis/slot) for an image from a defined set of choices. Alternatively, the user may choose "use default" to apply the default image, as defined on graphical user interface screen 500, to the network device 32. In other embodiments, image selection window 608 may allow a user to manually type in an IP address for a desired image rather than select an image from a defined set of choices.

Returning to FIG. 5, selection area 504 provides an organizational view of the positions in chassis 38. Because chassis 38 includes twenty-four receptors 37 to which twenty-four network devices 32 may be coupled, selection area 504 includes twenty-four numbered positions 508 that represent twenty-four receptors 37. As illustrated, positions 508 are user-selectable and are coded using a combination of shading and letters. The meaning of each shade and letter may be determined using legend 506. For example, clustered network devices 32 are indicated by a first shade 510. Thus, selection area 504 indicates that the fourth through eighth, fifteenth, and sixteenth positions 508 include clustered network devices 32. The particular positions 508 designated to cluster 100a (PBS) are indicated with check marks 512. Accordingly, as currently configured, cluster 100a (PBS) includes network devices 32 at the fourth, fifth, sixth, and seventh positions 508. Because the master location window in cluster parameters 502 identifies 0.0.4 as the location of the network device 32 that is operating as the cluster manager for cluster 100a (PBS), the fourth position 508 in selection area 504 also includes an "M" identifying the receptor 37 associated with the fourth position 508 as being coupled to the cluster manager.

The coding of the remaining boxes also provides the user with information about the network devices 32 and receptors 37 in chassis 38. For example, the fifteenth and sixteenth positions 508 are also of first shade 510. Because the fifteenth and sixteenth positions 508 are not marked with a check mark 512, however, a user using the organizational view of selection area 504 may easily determine that the fifteenth and sixteenth positions 508 belong to a cluster other than cluster 100a (PBS). As another example, a second shade 514 may be used to identify receptors 37 that are coupled to unclustered network devices 32. Positions 508 of second shade 514 that also include selection boxes 516 may be available for user selection. Selection of a selection box 516 designates the receptor 37 associated with the selected position 508 (and the coupled network device 32) to cluster 100a. Thus, upon checking a selection box 516, a position of second shade 514 will be converted to first shade 510 to indicate that the particular position 508 has been added to cluster 100a. Conversely, positions 508 of second shade 514 that do not include selection boxes 516 may identify "protected" positions as indicated by the "P." A protected position is one that is unavailable for selection to cluster 100a. Network devices 32 at protected positions may be used for administrative purposes and may include the software and hardware appropriate for performing administrative operations.

As currently configured, several positions in chassis 38 are currently unoccupied. An unoccupied position includes a receptor 37 in chassis 38 that does not have a network device 32 coupled to the receptor 37. Unoccupied positions may be indicated by a third shade 518 or a fourth shade 520. As summarized in legend 506, third shade 518 may indicate to the user that the position 508 and associated receptor 37 is unavailable for use. For example, the twentieth position 508 is of third shade 518. Thus, selection area 504 indicates to the user that the twentieth position 508 is unavailable for use. Conversely, the nineteenth, twenty-first, and twenty-fourth positions 508 are of fourth shade 520. Legend 506 indicates that positions of fourth shade 520 include receptors 37 that, although registered, are not coupled to network devices 32. The nineteenth and twenty-first positions also include selection boxes 516. In the illustrated example, the nineteenth and twenty-first positions 508 include check marks 512 identifying the positions 508 as belonging to cluster 100a. Thus, graphical user interface 500 has been used to designate the nineteenth and twenty-first positions 508 to cluster 100a even though the receptors 37 associated with the nineteenth and twenty-first positions 508 do not currently include network devices 32 coupled to the receptors 37.

Because the twenty-fourth position 508 is also of fourth shade 520, graphical user interface 500 also indicates that the twenty-fourth position 508 includes a receptor 37 that, although registered, is unoccupied. The twenty-fourth position 508, however, does not include a selection box 516. The lack of a selection box 516 may easily indicate to the user that the twenty-fourth position 508 is registered to a cluster 100 other than cluster 100a. Because the twenty-fourth position 508 is registered to another cluster 100, the receptor 37 associated with the twenty-fourth position 508 is not available for selection to cluster 100a.

The ability of a user to register an unoccupied position to cluster 100a enables resource reservation. The attributes and parameters specified to network devices 32 in cluster 100a are also applied to the registered but unoccupied receptors 37. Accordingly, when a network device 32 is coupled to a receptor 37 that was previously unoccupied, the attributes and parameters associated with cluster 100a are automatically associated with the new network device 32. Accordingly, system 30 automatically configures the new network device 32 similar to the other network devices comprising cluster 100a. As a result, the user is not required to manually configure the new network device 32.

In operation, graphical user interface 500 may be used during the creation of cluster 100a. Specifically, the organization view of chassis 38 as illustrated in selection area 504 may be used by a user to designate receptors 37 and network devices 32 to cluster 100a. Prior to the creation of cluster 100a, the majority of positions 508 displayed in selection area 504 are represented by second shade 514. Those positions unavailable for selection by the user would be of second shade 514 (without a selection box 516), of first shade 510, of fourth shade 520 (without a selection box), and of third shade 518 (without a selection box 516). For example, prior to creation of cluster 100a, the fourth through seventh positions 508 would be indicated by second shade 514 and a selection box 516. The nineteenth and twenty-first positions 508 would be indicated by fourth shade 520 with a selection box 516. The user viewing chassis 38 through graphical user interface screen 500 may select the fourth through seventh, nineteenth, and twenty-first positions 508 by placing a check mark 512 in the selection box 516 of each position 508. The selection of positions 508 would result in the designation of network devices 32 located in the fourth through seventh positions 508 to cluster 100a. The selection would also result in the reservation of unoccupied receptors 37 at the nineteenth and twenty-first positions 508 to cluster 100a.

Resource Provisioning

Because graphical user interface 500 allows a user to configure a cluster 100 as an entity rather than requiring the user to configure each network device 32 in the cluster 100 independently, graphical user interface 500 enables automatic resource provisioning. Specifically, graphical user interface 500 may be used to change attributes and parameters associated with cluster 100a in manner similar to that described above with regard to the initial creation of cluster 100a.

For example, a user may wish to add or change the receptors 37 within chassis 38 that should be designated to cluster 100a. Specifically, the user may wish to add a receptor 37 that includes a network device 32 that is available for selection for cluster 100a. Thus, a user may wish to add network devices 32 located at the ninth through fourteenth, seventeenth, eighteenth, or twenty-first through twenty-third positions 508 to cluster 100a. The existing parameters and attributes associated with cluster 100a are then applied to the new network devices 32 added to cluster 100a. As another example, the user may wish to designate a receptor 37 that though unoccupied is available for designation to cluster 100a. Other parameters that a user may wish to change may include the name of the cluster, the type of interconnection, or the location of the cluster manager. Whatever the change desired, graphical user interface screen 500 allows the change to be applied universally to each member of cluster 100a in a global manner.

Queue Configuration

Figure 7:
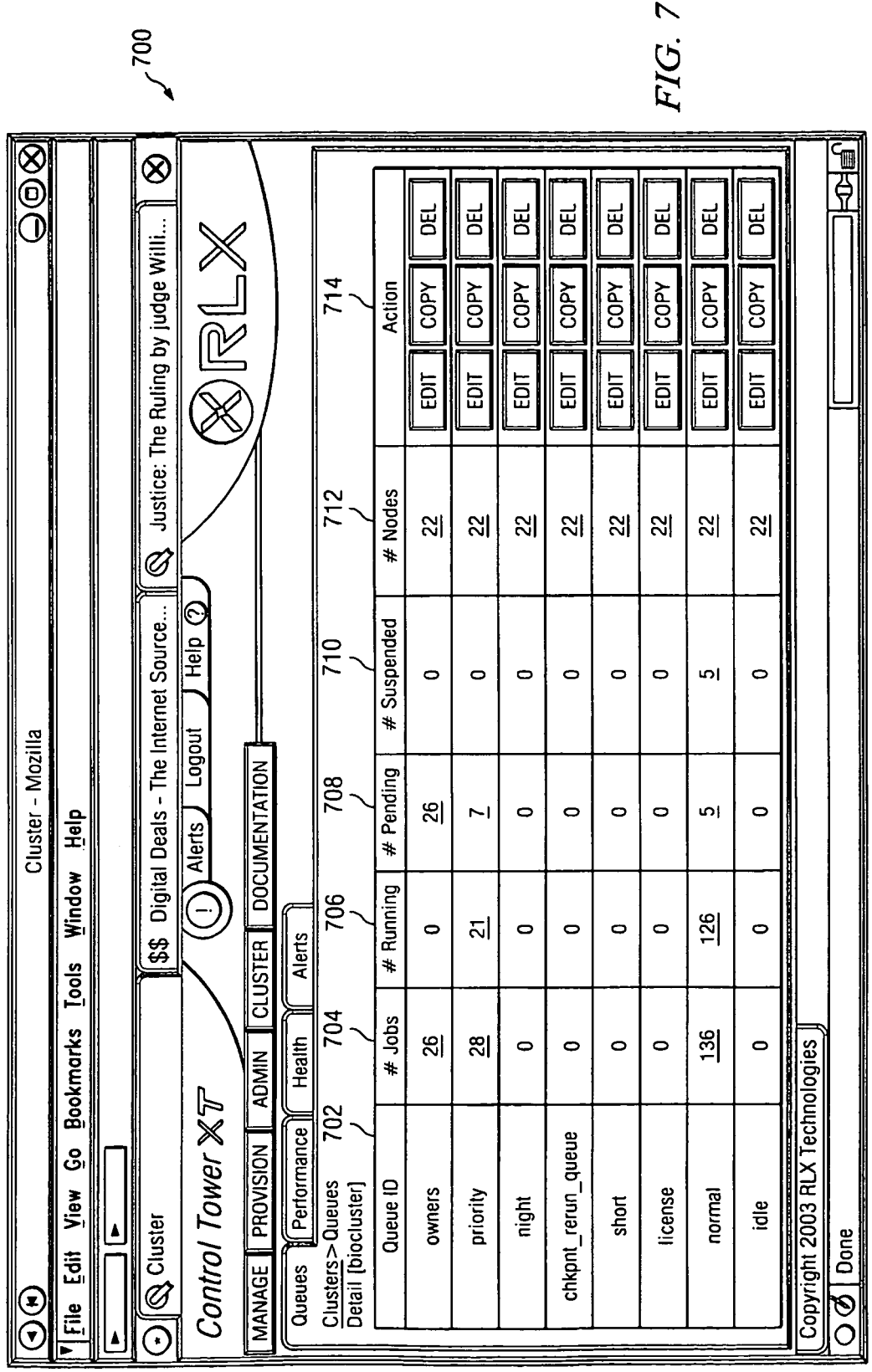

FIG. 7 illustrates an example graphical user interface screen 700 that further allows a user to define the personality of cluster 100. Specifically, graphical user interface screen 700 allows a user to configure the queues for a cluster 100. A queue is a job that will be performed by the particular cluster 100. Using graphical user interface screen 700, the user may define how and where the job queue will be run. Additionally, graphical user interface screen 700 may be used to monitor the jobs to be performed by the cluster 100 before the cluster 100 or a network device 32 in the cluster 100 are reconfigured. Thus, graphical user interface screen 700 may be used to determine the impact of reconfiguration on the cluster 100 or the jobs that are running in the cluster 100.

In the illustrated embodiment, graphical user interface screen 700 is in the form of table that includes columns corresponding to "Queue ID" 702, "# Jobs" 704, "# Running" 706, "# Pending" 708, "# Suspended" 710, "# Nodes" 712, and "Action" 714. "Queue ID 702" identifies Queue names. "# Jobs" 704 identifies the number of jobs currently in the queue associated for the particular cluster 100. "# Running" 706 identifies to the user the number of jobs that are currently running. A running job is one that is currently being performed by the cluster 100. "# Pending" 708 identifies the number of jobs that, although not currently running, are pending in the queue. A pending job is one that is in line to be run by the cluster 100 and has not been identified as being problematic. "# Suspended" 710 identifies those jobs that have been suspended for some reason. A suspended job may be one that has timed out or otherwise failed. "# Nodes" 712 identifies the number of nodes, or network devices 32, in the cluster that are identified to perform the job. "Action" 710 allows the user to edit, copy, or delete one or more jobs from the queue.

Performance Detail

Figure 8:
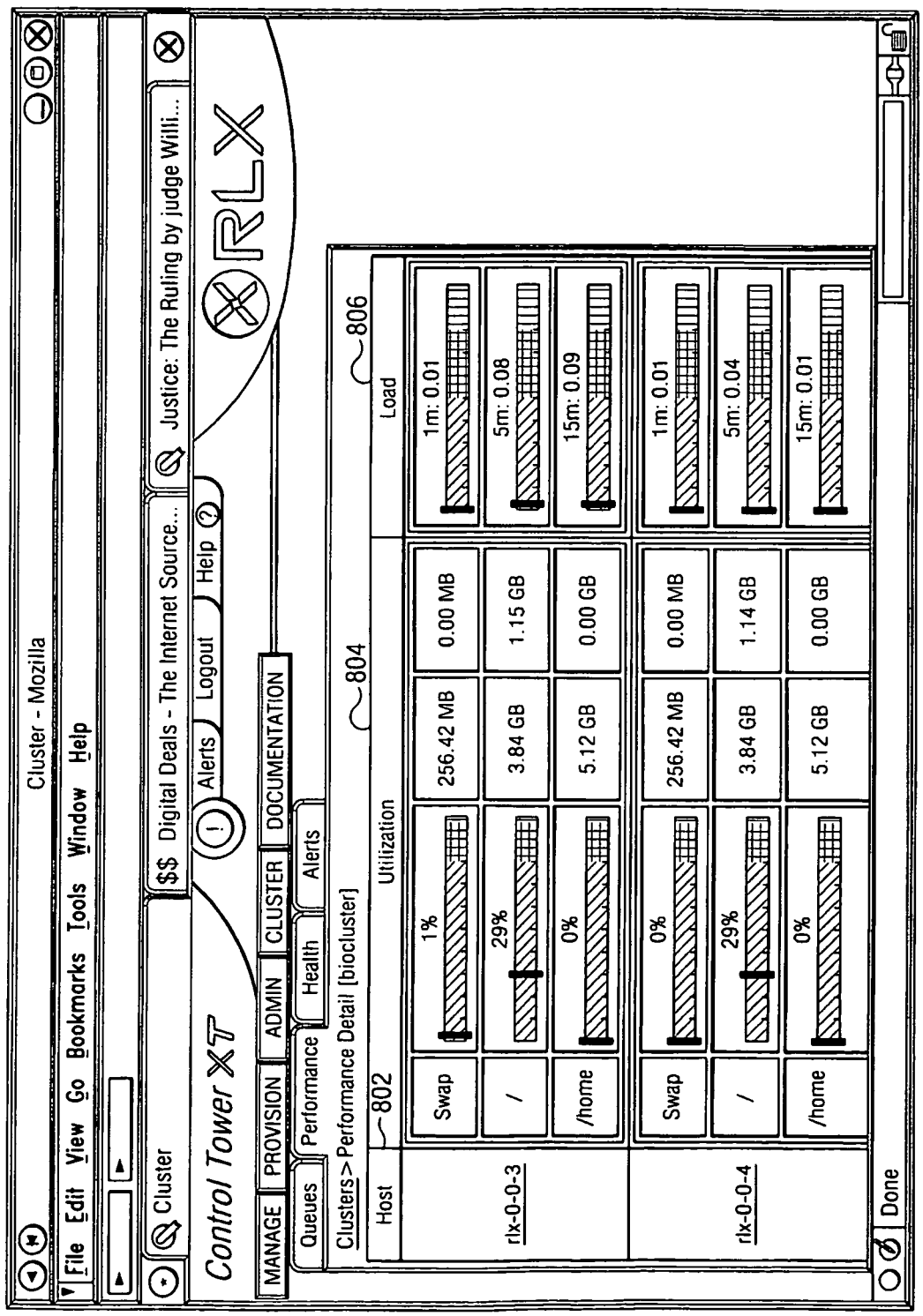

FIG. 8 illustrates a graphical user interface screen 800 that allows a user to further monitor and manage the utilization and load of a cluster 100. Where graphical user interface screen 400 provided the user with an aggregated view of the utilization and load of each cluster 100 as an entity, graphical user interface screen 800 allows a user to monitor the utilization and load of each network device 32 in a cluster 100. In the illustrated embodiment, graphical user interface screen 800 is in the form of a table that includes columns corresponding to host 802, utilization 804, and load 806. Host 802 identifies each network device 32 in cluster 100 by the physical location associated with each network device 32. As illustrated, host 802 also includes a prefix that further identifies the particular cluster 100. For example, each network device 32 identified on graphical user interface screen 800 includes a prefix of "rlx."

Utilization 804 summarizes the disk/storage usage for a particular network device 32. Each row is a partition ("swap", "/" (root), "/home"). Any existing partition will show up here. Numbers are in the format of "used space/total space."

Load 806 summarizes the load on each network device 32 in cluster 100. Similar to performance 414 described with regard to graphical user interface screen 400, load 806 is illustrated with multiple indicators 810 that summarize the ability of each network device 32 to handle a given load. Indicators 810 are proportionately shaded or colored to illustrate the number of processors waiting to boot. Green means normal, Yellow means high usage, Red means ver high usage and that the user is running out of space on that partition. Proportions are Green—<80%, Yellow 80-90%, and red >98%. Proportions are the same as the relative severity ranges are the same for any partition.

Although the present invention has been illustrated and described, in part, with regard to a blade server and chassis environment, those of ordinary skill in the art will recognize that the teachings of the present invention may be applied to practically any clustered server environment. For example, the teachings of the present invention may be applied to blade server, compute servers, web servers and/or any other server capable of being included in a cluster. Moreover, such clustered servers that incorporate the invention may be local (same or proximate physical location (e.g., within the same chassis)), or a distributed server environment.

Although the present invention has been described with several embodiments, various changes and modifications may be suggested to one of ordinary skill in the art. It is intended that the present invention encompass such changes and modifications as fall within the scope of the appended claims.

What is claimed is:

1. Compute clustering software embodied in a non-transitory computer-readable medium and operable to provide a graphical user interface (GUI), the GUI operable to:
    present a selection area for illustrating a plurality of receptors in a chassis, each receptor configured to couple to a network device, wherein the selection area conveys a physical location of each of the plurality of receptors;
    receive information from a user to create a defined cluster by pointing and clicking on a portion of the plurality of receptors illustrated in the selection area;
    present an image selection window with a plurality of software image choices;
    receive a selection in the image selection window for each of one or more receptors in the defined cluster;

indicate if a network device is presently coupled to a respective receptor of the defined cluster; and receive input to indicate if a network device that is later coupled to a currently unoccupied receptor is to be automatically configured; and wherein the software is operable to detect presence of a particular network device coupled to a receptor in the defined cluster that was previously unoccupied, and install a particular software image for the particular network device automatically only if automatic configuration was indicated by the received input.

2. The software of claim 1, wherein the GUI is further operable to:

present a parameter area for illustrating a plurality of parameters;

receive a selected set of parameters via the parameter area; and update some or all network devices of the defined cluster automatically using the selected set of parameters.

3. The software of claim 2, wherein the GUI is further operable to receive a default image selection for each of one or more selected receptors in the defined cluster.

4. The software of claim 2, wherein the GUI is further operable to:

receive information from a user to create at least a second defined cluster by pointing and clicking on another portion of the plurality of receptors illustrated in the selection area;

receive a second selected set of parameters via the parameter area; and wherein the software is operable to update some or all network devices of the second defined cluster automatically using the second selected set of parameters.

5. The software of claim 4, wherein the GUI is further operable to display aggregate performance information for each defined cluster and to also display performance information for each individual network device within each defined cluster.

6. The software of claim 1, wherein the plurality of receptors illustrated in the selection area include receptors on a printed circuit board.

7. The software of claim 1, wherein receiving the selection comprises receiving a selection of a software image selected from the software image choices to associate with at least one network device connected to a receptor in the defined cluster.

8. The software of claim 1, wherein the selection area displays the plurality of receptors according to the physical locations of the plurality of receptors in the chassis.

9. The software of claim 1, wherein the selection area displays a first visual indicator associated with each of the plurality of receptors that are clustered in the defined cluster, and displays a second, different visual indicator associated with each of the plurality of receptors that is not part of any cluster.

10. The software of claim 9, wherein the selection area displays a third, different visual indicator to identify a given one of the plurality of receptors as being unavailable for selection to include in any cluster.

11. A non-transitory computer-readable storage medium storing software executable by a computer to:

present, in a graphical user interface (GUI), a selection area for displaying a plurality of receptors in a chassis, where each of the receptors is configured to couple to a corresponding network device, and where the selection area conveys physical locations of the plurality of receptors in the chassis;

receive, in the GUI, information relating to user selection of a subset of the plurality of receptors displayed in the selection area, where the subset of receptors is part of a defined cluster;

present, in the GUI, an image selection window having a plurality of choices regarding software images that are capable of being associated with network devices connected to respective receptors;

receive a selection of at least one of the choices to select at least one image to associate with the network devices connected to the receptors in the subset for the defined cluster;

indicate if a receptor of the defined cluster is coupled to a network device;

receive input to indicate if a network device that is later coupled to a currently unoccupied receptor is to be automatically configured;

detect presence of a particular network device coupled to a receptor that was previously unoccupied; and install a particular software image for the particular network device automatically in response to the received input indicating that automatic configuration is to be performed.

12. The non-transitory computer-readable storage medium of claim 11, wherein the plurality of receptors displayed in the selection area include receptors on a printed circuit board.

13. The non-transitory computer-readable storage medium of claim 12, wherein the selection area displays the plurality of receptors according to the physical locations of the plurality of receptors on the printed circuit board.

14. The non-transitory computer-readable storage medium of claim 11, wherein the selection area displays a first visual indicator associated with each of the receptors in the subset, and displays a second, different visual indicator associated with each of the plurality of receptors that is not part of any cluster.

15. The non-transitory computer-readable storage medium of claim 14, wherein the selection area displays a third, different visual indicator to identify a given one of the plurality of receptors as being unavailable for selection to include in any cluster.

16. The non-transitory computer-readable storage medium of claim 11, wherein the selection area includes selection boxes associated with respective ones of the receptors, where each of the selection boxes are selectable by a user to identify the receptors that are part of the subset for the defined cluster.

17. A method comprising:

presenting, in a graphical user interface (GUI) presented by a computer, a selection area for displaying a plurality of receptors in a chassis, where each of the receptors is configured to couple to a corresponding network device, and where the selection area conveys physical locations of the plurality of receptors in the chassis;

receiving, in the GUI, information relating to user selection of a subset of the plurality of receptors displayed in the selection area, where the subset of receptors is part of a defined cluster;

presenting, in the GUI, an image selection window having a plurality of choices regarding software images that are capable of being associated with network devices connected to respective receptors;

receiving a selection of at least one of the choices to select at least one software image to associate with the network devices connected to the receptors in the subset for the defined cluster;

indicating if a receptor of the defined cluster is coupled to a network device;

receiving input to indicate if a network device that is later coupled to a currently unoccupied receptor is to be automatically configured;

detecting presence of a particular network device coupled to a receptor that was previously unoccupied; and installing a particular software image for the particular network device automatically in response to the received input indicating that automatic configuration is to be performed.

18. The method of claim 17, wherein the plurality of receptors displayed in the selection area include receptors on a printed circuit board.

19. The method of claim 17, wherein the selection area displays a first visual indicator associated with each of the receptors in the subset, and displays a second, different visual indicator associated with each of the plurality of receptors that is not part of any cluster.

* * * * *